(12) United States Patent
Darty (10) Patent No.: US 7,170,470 B2
(45) Date of Patent: Jan. 30, 2007

(54) METHODS AND APPARATUS FOR SUBJECTING AN ELEMENT TO AN ELECTRICAL FIELD

(75) Inventor: Mark Darty, Bartlett, TN (US)

(73) Assignee: Brother International Corporation, Bridgewater, NJ (US)

( * ) Notice: Subject to any disclaimer, the term of this patent is extended or adjusted under 35 U.S.C. 154(b) by 215 days.

(21) Appl. No.: 10/216,445

(22) Filed: Aug. 12, 2002

(65) Prior Publication Data

US 2002/0190936 A1  Dec. 19, 2002

Related U.S. Application Data

(62) Division of application No. 09/667,807, filed on Sep. 22, 2000, now Pat. No. 6,879,314.

(60) Provisional application No. 60/156,432, filed on Sep. 28, 1999.

(51) Int. Cl.
*G09G 3/34* (2006.01)
*G02B 26/00* (2006.01)

(52) U.S. Cl. .................. 345/55; 345/107; 345/85; 345/86; 359/296

(58) Field of Classification Search .............. 345/84, 345/107, 86, 55, 85; 427/214; 359/296; 264/437
See application file for complete search history.

(56) References Cited

U.S. PATENT DOCUMENTS

| | | | |
|---|---|---|---|
| 3,612,758 A | 10/1971 | Evans et al. ............ 178/5.4 R |
| 3,668,106 A | 6/1972 | Ota ............................ 358/305 |
| 4,045,327 A | 8/1977 | Noma et al. ............ 204/299 R |
| 4,093,534 A | 6/1978 | Carter et al. ................ 350/355 |
| 4,126,528 A | 11/1978 | Chiang .................... 204/180 R |
| 4,126,854 A | 11/1978 | Sheridon .................... 345/107 |
| 4,203,106 A | 5/1980 | Dalisa et al. ............... 340/787 |
| 4,209,481 A * | 6/1980 | Kashiro et al. ............. 264/437 |
| 4,272,596 A | 6/1981 | Harbour et al. .............. 430/37 |
| 4,285,801 A | 8/1981 | Chiang .................... 204/299 R |
| 4,311,361 A | 1/1982 | Somlyody .................... 350/267 |
| 4,438,160 A * | 3/1984 | Ishikawa et al. ............ 427/214 |

(Continued)

OTHER PUBLICATIONS

Tipler, P.A., *Physics*, Second Edition, Worth Publishers, Inc., New York, NY, 1982.

(Continued)

*Primary Examiner*—Albert Decady
*Assistant Examiner*—Fritz Alphonse
(74) *Attorney, Agent, or Firm*—Oliff & Berridge, PLC (57) ABSTRACT

The invention includes providing a display by moving a colorant particle, having an electric charge, inside a channel of a body in a direction that is substantially parallel to a direction of extension of the channel and a direction of incoming illumination rays. The colorant particle can be moved between a position at a bottom of the channel and at a top of the channel by the force of an electric field generated by a charge at the bottom of the channel. The invention can be applied to an analog dot display as well as a digital dot display. The invention covers methods of manufacturing the displays discussed above. The invention is also not limited to covering displays, and also covers at least print media, wherein colorant particles are locked at appropriate locations within the channels, either temporarily or permanently.

14 Claims, 9 Drawing Sheets

U.S. PATENT DOCUMENTS

| | | | |
|---|---|---|---|
| 4,440,638 A * | 4/1984 | Judy et al. | 204/672 |
| 4,522,472 A | 6/1985 | Liebert et al. | 350/362 |
| 4,640,583 A | 2/1987 | Hoshikawa et al. | 350/343 |
| 4,678,695 A * | 7/1987 | Tung et al. | 428/120 |
| 4,704,002 A | 11/1987 | Kikuchi et al. | 350/334 |
| 4,725,494 A * | 2/1988 | Belisle et al. | 428/325 |
| 4,741,604 A | 5/1988 | Kornfeld | 350/362 |
| 4,804,601 A | 2/1989 | Watson et al. | 430/32 |
| 5,344,594 A | 9/1994 | Sheridon | 264/4.1 |
| 5,380,362 A * | 1/1995 | Schubert | 106/493 |
| 5,745,094 A | 4/1998 | Gordon, II et al. | 345/107 |
| 5,760,761 A | 6/1998 | Sheridon | 345/107 |
| 5,764,401 A | 6/1998 | Udaka et al. | 359/270 |
| 5,808,783 A | 9/1998 | Crowley | 359/296 |
| 5,837,414 A | 11/1998 | Kitani | 430/108.01 |
| 5,872,552 A | 2/1999 | Gordon, II et al. | 345/107 |
| 5,914,806 A | 6/1999 | Gordon II et al. | 359/296 |
| 5,922,268 A * | 7/1999 | Sheridon | 264/437 |
| 5,961,804 A | 10/1999 | Jacobson et al. | 204/606 |
| 5,986,629 A | 11/1999 | Smith et al. | 345/84 |
| 6,017,584 A | 1/2000 | Albert et al. | 427/213.3 |
| 6,025,896 A | 2/2000 | Hattori et al. | 349/86 |
| 6,038,059 A | 3/2000 | Silverman | 359/296 |
| 6,052,287 A | 4/2000 | Palmer et al. | 361/767 |
| 6,067,185 A | 5/2000 | Albert et al. | 359/296 |
| 6,113,810 A | 9/2000 | Hou et al. | 252/572 |
| 6,120,839 A | 9/2000 | Comiskey et al. | 427/213.3 |
| 6,130,774 A | 10/2000 | Albert et al. | 359/296 |
| 6,144,361 A | 11/2000 | Gordon, II et al. | 345/107 |
| 6,172,798 B1 | 1/2001 | Albert et al. | 359/296 |
| 6,177,921 B1 | 1/2001 | Comiskey et al. | 345/107 |
| 6,184,856 B1 | 2/2001 | Gordon, II et al. | 345/107 |
| 6,221,267 B1 | 4/2001 | Ikeda et al. | 216/24 |
| 6,222,513 B1 | 4/2001 | Howard et al. | 345/84 |
| 6,225,971 B1 | 5/2001 | Gordon, II et al. | 345/107 |
| 6,232,950 B1 | 5/2001 | Albert et al. | 345/107 |
| 6,239,896 B1 | 5/2001 | Ikeda | 359/240 |
| 6,249,271 B1 | 6/2001 | Albert et al. | 345/107 |
| 6,262,706 B1 | 7/2001 | Albert et al. | 345/107 |
| 6,262,833 B1 | 7/2001 | Loxley et al. | 359/296 |
| 6,271,823 B1 | 8/2001 | Gordon, II et al. | 345/107 |
| 6,300,932 B1 | 10/2001 | Albert | 345/107 |
| 6,312,304 B1 | 11/2001 | Duthaler et al. | 445/24 |
| 6,323,989 B1 | 11/2001 | Jacobson et al. | 359/296 |
| 6,327,072 B1 | 12/2001 | Comiskey et al. | 359/296 |
| 6,330,054 B1 | 12/2001 | Ikami | 355/400 |
| 6,340,965 B1 | 1/2002 | Howard et al. | 345/107 |
| 6,373,461 B1 | 4/2002 | Hasegawa et al. | 345/107 |
| 6,376,828 B1 | 4/2002 | Comiskey | 250/216 |
| 6,392,785 B1 | 5/2002 | Albert et al. | 359/296 |
| 6,392,786 B1 | 5/2002 | Albert | 359/296 |
| 6,396,205 B1 | 5/2002 | Sprague | 313/477 R |
| 6,422,687 B1 | 7/2002 | Jacobson | 347/55 |
| 6,441,881 B1 | 8/2002 | Enomoto et al. | 349/156 |
| 6,445,374 B2 | 9/2002 | Albert et al. | 345/107 |
| 6,445,489 B1 | 9/2002 | Jacobson et al. | 359/296 |
| 6,456,272 B1 | 9/2002 | Howard et al. | 345/107 |
| 6,459,418 B1 | 10/2002 | Comiskey et al. | 345/107 |
| 6,473,072 B1 | 10/2002 | Comiskey et al. | 345/173 |
| 6,486,861 B1 | 11/2002 | Preas et al. | 345/87 |
| 6,486,866 B1 | 11/2002 | Kuwahara et al. | 345/107 |
| 6,486,901 B1 | 11/2002 | DeBoer et al. | 346/140.1 |
| 6,487,002 B1 | 11/2002 | Biegelsen | 359/296 |
| 6,498,114 B1 | 12/2002 | Amundson et al. | 438/780 |
| 6,504,524 B1 | 1/2003 | Gates et al. | 345/107 |
| 6,512,354 B2 | 1/2003 | Jacobson et al. | 324/71.1 |
| 6,515,649 B1 | 2/2003 | Albert et al. | 345/107 |
| 6,517,618 B2 | 2/2003 | Foucher et al. | 106/31.16 |
| 6,518,949 B2 | 2/2003 | Drzaic | 345/107 |
| 6,524,153 B1 | 2/2003 | Ikeda et al. | 445/24 |
| 6,525,865 B2 | 2/2003 | Katase | 359/296 |
| 6,525,866 B1 | 2/2003 | Lin et al. | 359/296 |
| 6,529,313 B1 | 3/2003 | Lin et al. | 359/296 |
| 6,531,997 B1 | 3/2003 | Gates et al. | 345/107 |
| 6,535,197 B1 | 3/2003 | Comiskey et al. | 345/107 |
| 6,535,326 B2 | 3/2003 | Uno | 359/296 |
| 6,538,801 B2 | 3/2003 | Jacobson et al. | 359/296 |
| 6,545,291 B1 | 4/2003 | Amundson et al. | 257/40 |
| 6,545,797 B2 | 4/2003 | Chen et al. | 359/296 |
| 2003/0013238 A1 | 1/2003 | Ogawa | 438/151 |
| 2003/0016429 A1 | 1/2003 | Ikeda et al. | 359/238 |
| 2003/0048521 A1 | 3/2003 | Ikeda et al. | 359/296 |

OTHER PUBLICATIONS

Tripler, P.A., *Physics* Second Edition, Worth Publishers, Inc., New York, NY, 1982.

* cited by examiner

Step 1: Fabricate Holes In Substrate

Step 2: Metalize E-Field Electrodes and Circuitry on Bottom Side

Step 3: Fuse or Laminate Bottom Cover

Step 4: Fill Cyindrical Cavities with Colorants and Fluid

Step 5: Affix Transparent Top Cover

METHODS AND APPARATUS FOR SUBJECTING AN ELEMENT TO AN ELECTRICAL FIELD

BACKGROUND OF THE INVENTION

1. Field of Invention

The invention relates to apparatus and methods for subjecting an element, such as a colorant particle, to an electric field, so as to provide images, such as video or still images.

2. Description of Related Art

The conventional art includes various technologies for displaying still and/or video images. These technologies include silicon micro-opto-electro-mechanical systems (MOEMs), such as a micro-mirror XGA display for use in portable business projectors, liquid crystal displays, such as displays that include liquid crystal on glass, plastic and silicon, plasma displays and cathode ray tubes (CRTs).

However, the conventional displays are subject to several problems. For example, the conventional displays that attain high definition are expensive and have slow refresh rates. The technology of some of the conventional displays cannot be applied to provide either very small or very large displays. Some of the conventional displays require complex control systems. Other conventional displays require a relatively large amount of power to operate.

SUMMARY OF THE INVENTION

It is therefore desirable to provide relatively inexpensive and efficient methods and apparatus for displaying still and video images. It is also desirable to provide such methods and apparatus that are not limited by size constraints so as to be applicable to very small or very large displays. It is further desirable to provide such methods and apparatus that do not require either a relatively large amount of power or a complex control system to operate.

These and other advantages can be provided by applying an electric field to a colorant particle that has an electric charge. The invention can thereby achieve either a monochromatic or full color video, or still image display, having very high resolution and unlimited grayscale and color levels.

More specifically, in accordance with the invention, a colorant particle, having an electric charge, and ranging in size from a single atom to a molecular collection several millimeters in size, can be moved inside a channel of a body in a direction that is substantially parallel to a direction of incoming illumination rays. The particle can be moved inside the channel, between a position at a bottom of the channel and a position at a top of the channel, by the force of an electric field generated by a charge at the bottom of the channel.

When the colorant particle is disposed at a position at the top of the channel, a substantial portion of light entering the top of the channel reflects off the colorant particle and exits the top of the channel, such that light of the same color as the colorant particle is reflected. A user disposed at a position adjacent the top of the channel thereby views light that is the same as the colorant particle.

Alternatively, when the colorant particle is disposed at a position at the bottom of the channel, a substantial portion of light entering the top of the channel does not reflect off the colorant particle. The user therefore does not view light that is the same color as the colorant particle.

Differing amounts of the light are reflected to the user when the colorant particle is disposed at different positions between the top and bottom of the channel. For example, a relatively large amount of the light is reflected when the colorant particle is disposed near the top of the channel. Alternatively, a relatively small amount of the light is reflected when the colorant particle is disposed near the bottom of the channel. Thus, moving the colorant particles between positions at the top and bottom of the channel enables differing intensities of individual colors, corresponding to the colors of the colorant particles, to be reflected.

The invention can be applied to an analog dot display, wherein each colorant particle is positioned in analog fashion at any position along the direction of extension of the channel. However, the invention can also be applied to a digital dot display, wherein each colorant particle only has two stationary positions, i.e., at the top and bottom ends of the channel.

The invention is also intended to cover methods of manufacturing any of the displays discussed above. Such methods can include the steps of defining channels in a carrier body, metalizing E-field electrodes and circuitry on a bottom surface of the carrier body, affixing a bottom cover at a bottom end of each of the channels, filling each of the channels with at least one colorant particle of the appropriate color, and affixing a transparent top cover to a top end of each of the channels. The step of filling each of the channels with at least one colorant particle of the appropriate color can be accomplished by filter plates.

The invention is also not limited to only covering video and still picture displays. Instead, the invention is also intended to cover print media. Print media can be provided in accordance with the invention by locking the colorant particles at appropriate locations within the channels, either temporarily or permanently.

These and other features and advantages of this invention are described in, or are apparent from the following detailed description of various exemplary embodiments of the systems and methods according to this invention.

BRIEF DESCRIPTION OF THE DRAWINGS

Various exemplary embodiments of systems and methods according to this invention will be described in detail, with reference to the following figures, wherein.

DETAILED DESCRIPTION OF PREFERRED EMBODIMENTS

Figure 1:
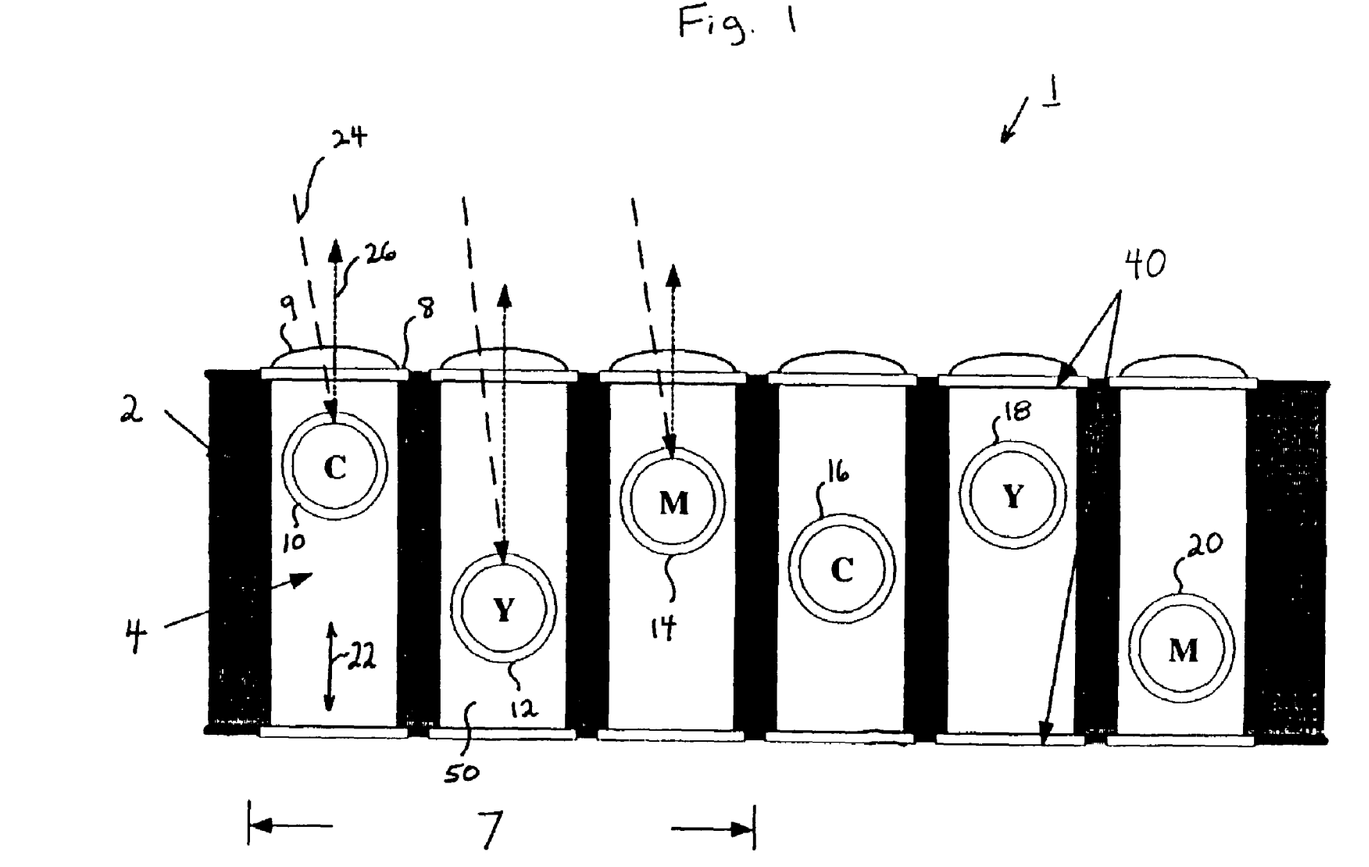
FIG. 1 is a schematic diagram that shows a display in accordance with an embodiment of the invention.

FIG. 1 is a schematic diagram that shows a display in accordance with an embodiment of the invention. The display 1 includes a carrier body 2 that defines multiple channels 4. The carrier body 2 can be made of a variety of materials, such as, for example, silicon, plastic, organic biomaterials and ceramic.

A bottom cover 6 extends across a bottom end of each of the channels 4. A top cover 8 extends across a top end of each of the channels 4. The bottom and top covers 6, 8 can close off the channels 4 so as to define a sealed area therein. Each of the top and bottom covers 6, 8 can be defined by a single sheet, or alternatively can include multiple separate elements, each element covering a single channel 4.

A lens 9 can be provided on top of each of the top covers 8 in order to enhance optical characteristics. The lens 9 can be made of a variety of materials, such as transparent plastic. The lens 9 can be defined by a single sheet, or alternatively can include multiple separate elements, each element being disposed adjacent a single channel 4. Any type of lens that improves optical characteristics of the display can be used.

The embodiment shown in FIG. 1 shows the lens 9 being separate from the top cover 8. However, the invention is not limited to this structure. For example, a single element can be provided to achieve the operation of the lens 9 and the cover 8. Also, the display can be provided without including the lens 9 at all.

Colorant particles are disposed within at least some of the channels 4. Different colors of colorant particles can be used to provide a color display. For example, cyan particles 10, 16, yellow particles 12, 18 and magenta particles 14, 20 can be disposed in the channels 4 to provide a color display. However, any other combination of colored particles, for example particles having other fundamental colors, such as red, green and blue, can be used.

Each pixel of the display can include a group of channels 7 that houses one particle of each of the fundamental colors. In other words, each pixel, which can be any size, such as 45–60 microns, can be defined by one cyan particle 10, one yellow particle 12 and one magenta particle 14. The display 1 can thereby provide any color. Further, the pixels can be used to achieve the requisite grayscale effects to realize photographic quality images.

Anything that has color can be used as the colorant particles. In fact, the colorant particles can be either solid or liquid. Various techniques, such as micro-encapsulation, can be used to enable the use of liquid colorant particles. However, micro-encapsulation can be used with solid particles, as well as liquid particles, to prevent, or at least minimize, abrasive wear of the colorant particles against interior surfaces, such as inner sidewalls, of the channels 4.

The colorant particles are not limited by size. For example, each colorant particle can be a single atom or alternatively be several millimeters in size. Since the colorant particles can be extremely small, and the display can define an array of channels that each have an extremely small width, very high resolution of images can be achieved. For example, the resolution of the display 1 can be thousands of lines per inch.

The colorant particles are similarly not limited by shape. The colorant particles shown in FIG. 1 are spherical. However, colorant particles of any other shape can be provided. For example, the colorant particles can be rectangular, cylindrical, oblong, triangular, etc.

The channels 4 are also not limited to any particle size or shape. For example, very small channels 4 can be provided to correspond with very small particles. Alternatively, very large channels 4 can be provided to correspond with very large particles. Further, the channels 4 can be provided in any shape. For example, a cross-section of the channels 4 can define any shape, such as a circle, square, rectangle, triangle, etc.

Because of the flexibility in size and shape of the channels 4 and particles, the overall size of the display 1 is similarly not limited by size or shape. For example, channels 4 that are large in size and/or large in number can be provided with a corresponding number and/or size of particles to achieve a very large display 1. Alternatively, channels 4 that are small in size and/or are small in number can be provided with a corresponding number and/or size of particles to achieve a very small display 1. Further, channels 4 and colorant particles of any size can be arranged so as to define a display of any shape.

In operation, the colorant particles can move in a direction 22, which is substantially parallel to a direction of extension of the channels 4. When a colorant particle is disposed near the top end of the channels 4, such as where cyan particle 10 is disposed in FIG. 1, entering light 24 entering the channel 4 through the top cover 8 and lens 9 is reflected off of the cyan particle 10 and exits as viewable exiting light 26 out of the display 1 via the cover 8 and lens 9. The viewable exiting light 26 that reflects off of the cyan particle 10 is cyan colored light. Thus, a user disposed adjacent the top end of the channels 4 would view the viewable cyan exiting light 26.

However, when a colorant particle is disposed near the bottom end of the channels 4, such as where magenta particle 20 is disposed in FIG. 1, a substantial amount of entering light entering the channels 4 through the top cover 8 and lens 9 is not reflected off of the magenta particle 20, and therefore does not exit as viewable exiting light out of the display. Instead, a substantial amount of entering light intersects and is absorbed by sidewalls of the channels 4, or within a liquid or gas occupying volume inside the channels 4. Thus, a user disposed adjacent the top end of the channels 4 would not view magenta colored light. Instead, the channel 4 having the magenta particle 20 would appear dark.

Differing amounts of light are reflected off of the colorant particles to exit the display as exiting light depending on the location of the colorant particles within the channels 4. This effect is obtained since light entering the top end of the channels 4 via the lens 9 and top cover 8, at a relatively wide range of angles, intersects colorant particles that are disposed near the top end of the channels 4. For example, light entering the channels at angles of approximately 45° on either side of the direction of movement of the colorant particles, indicated as arrow 22, intersects a colorant particle disposed near the top of the channels 4, such as cyan particle 10.

Contrarily, light entering the top of the channels 4, via the lens 9 and top cover 8, at a relatively small range of angles, intersects colorant particles that are disposed near the bottom end of the channels 4. For example, only light entering the channels at angles of approximately 5° on either side of the direction of movement of the colorant particles, indicated by arrow 22, intersects a colorant particle disposed near the bottom of the channels 4, such as magenta particle 20. Instead, the remainder of the light entering the channel 4 intersects and is absorbed by sidewalls of the channel 4.

Thus, not enough light may be reflected off of the particles disposed near the bottom end of the channel 4 to be visible to the user.

Since a relatively large amount of light is reflected off of a colorant particle disposed near the top end of its respective channel, a user views relatively intensely colored light corresponding to the color of that particle. However, the intensity of the colored light viewed by the user decreases as the particle moves toward the bottom end of the channels 4. For example, a user would view yellow light reflecting off of yellow particle 12 as being less intense than the cyan light reflecting off of cyan particle 10. The intensity of viewable colored light decreases until the particle is disposed near the bottom end of the channels wherein very little or no colored light is visible to the user.

This invention is intended to cover all apparatus and methods of moving the colorant particles within the channels 4 along direction 22. However, FIG. 2 is a schematic diagram that shows an exemplary embodiment of a structure for moving the colorant particles within the channels 4.

Figure 2:
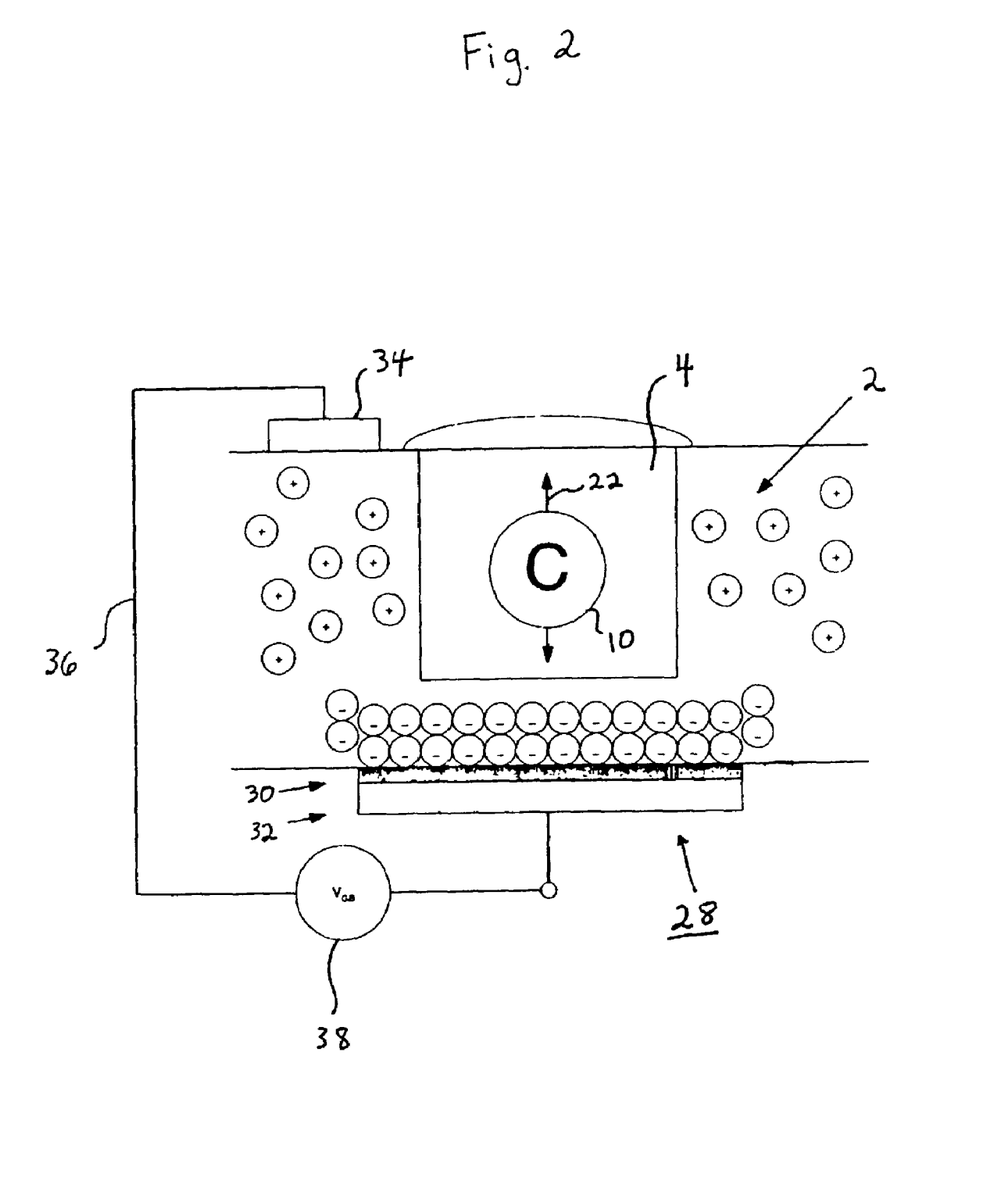
FIG. 2 is a schematic diagram that shows an exemplary embodiment of a structure for moving the colorant particles within the channels.

In the exemplary embodiment shown in FIG. 2, the carrier body 2 is made of silicon. A lower MOS gate terminal 28 is provided at a lower surface of the carrier body 2 beneath each channel 4. The lower MOS gate terminal includes an oxide layer 30 disposed on the lower surface of the carrier body 2 and a metal layer 32 disposed on the oxide layer 30. The MOS gate terminal 28 is connected to an upper Si Bulk connection 34 via a signal line 36 to provide gate bias voltage 38.

FIG. 2 shows Silicon Bulk p-type bulk doping. Specifically, by simply changing gate bias voltage polarity and magnitude, the silicon region of the carrier body 2 directly over the oxide layer 30 will either be charged positive or negative. The charge of the carrier body 2 directly over the oxide layer 30 and directly under the channel 4 creates an electric field in the channel 4 in the direction of extension 22 of the channel 4. Thus, if the colorant particle 10 is provided with an electric charge, the colorant particle will react with the electric field in the channel, such that changing the gate voltage can be used to control the position of the colorant particle 10 within the channel.

However, as discussed above, the invention is intended to cover any apparatus and method of moving the colorant particle. For example, the exemplary embodiment of FIG. 1 provides electrode rings 40 at both of the top and bottom ends of each channel. The electrode rings 40 can produce a sufficient charge to achieve an electric field to react with a charged colorant particle to move the colorant particle along direction 22.

Figure 3:
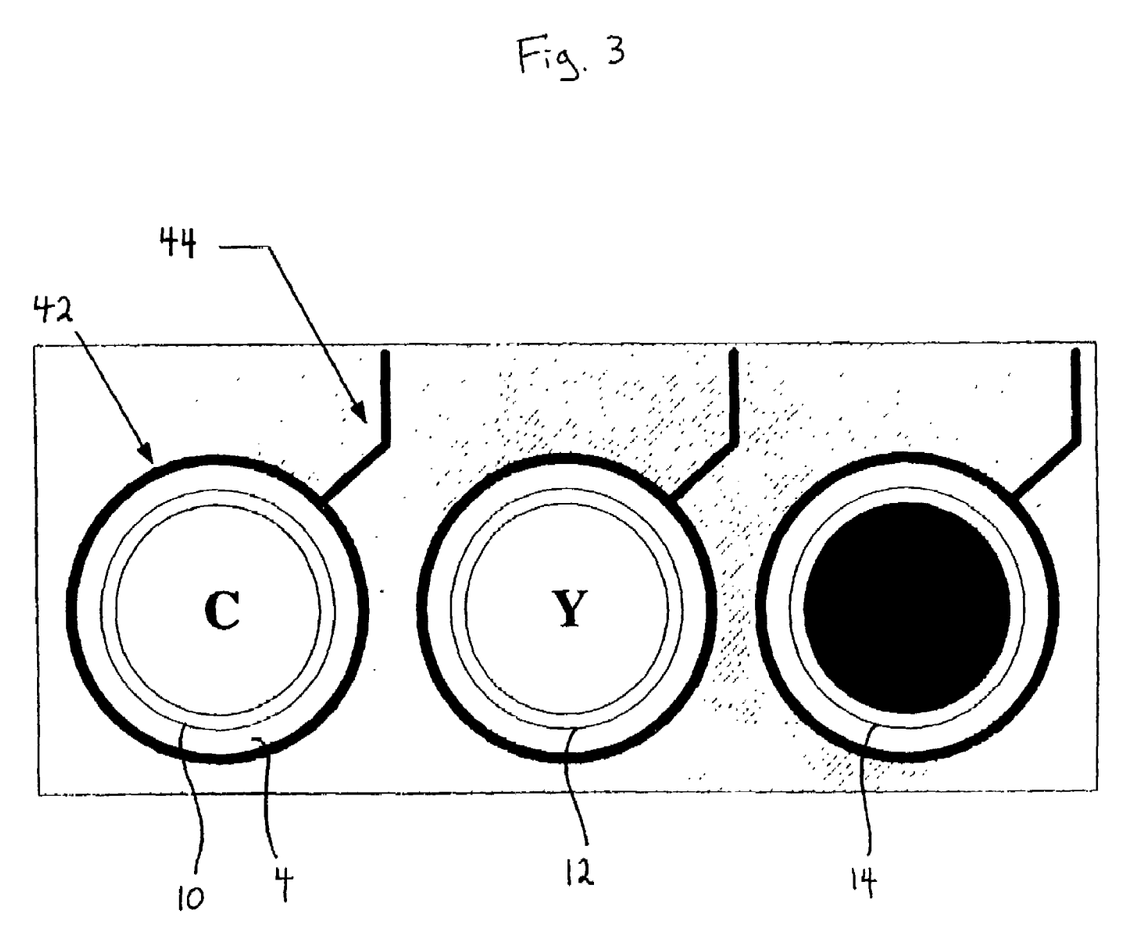
FIG. 3 is a top view of the display of FIG. 1 that shows electrode rings.

FIG. 3 is a top view of the display of FIG. 1 that shows electrode rings. Specifically, electrode rings 42 are provided around each of the channels 4. Each of the electrode rings 42 is connected to an electrical trace 44 for connection to a supply of control voltage.

Figure 4:
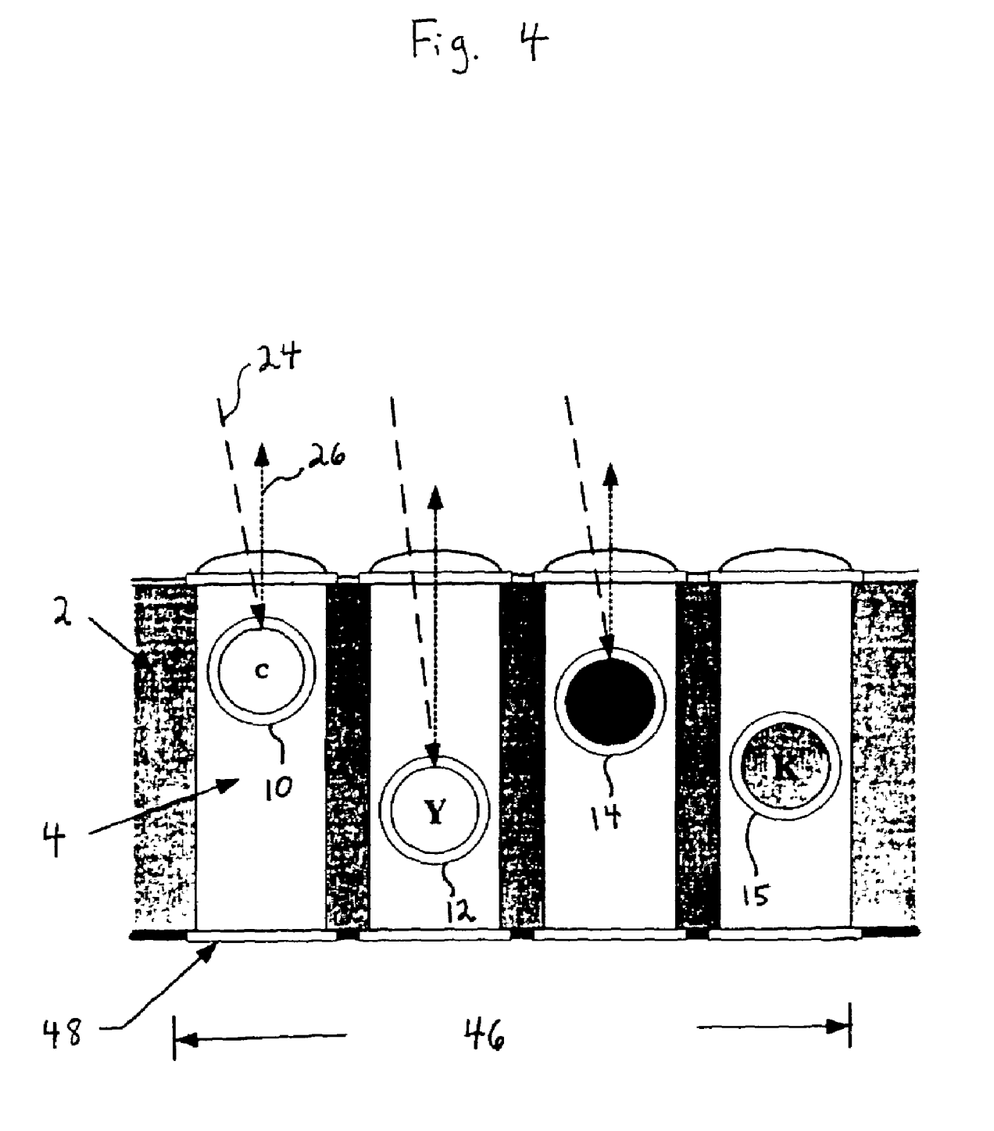
FIG. 4 is a schematic diagram that shows a display in accordance with an alternative embodiment of the invention.

FIG. 4 is a schematic diagram that shows a display in accordance with an alternative embodiment of the invention. In this embodiment, the group of channels 46 that defines each pixel includes one cyan particle 10, one yellow particle 12, one magenta particle 14 and one black particle 15.

However, the display of FIG. 4 is also different from the display of FIG. 1, in that the display of FIG. 4 only includes a single electrode ring 48 for each channel 4. Specifically, an electrode ring 48 is only provided at a bottom end of each channel 4 to achieve an electric field to react with a charged colorant particle.

Apparatus and methods discussed above can be applied to an analog dot display form, wherein the colorant particles can be moved in analog fashion to any position within the channels 4. As shown in FIG. 1, a fluid 50 can be provided in the channels to dampen the analog movement of the colorant particles. The fluid 50 can be either a liquid or a gas. Dampening the analog movement of the colorant particles helps to achieve precise positioning of the colorant particles by enabling a controller to precisely determine the location of each colorant particle along the direction of elongation of its respective channel 4.

Figure 5:
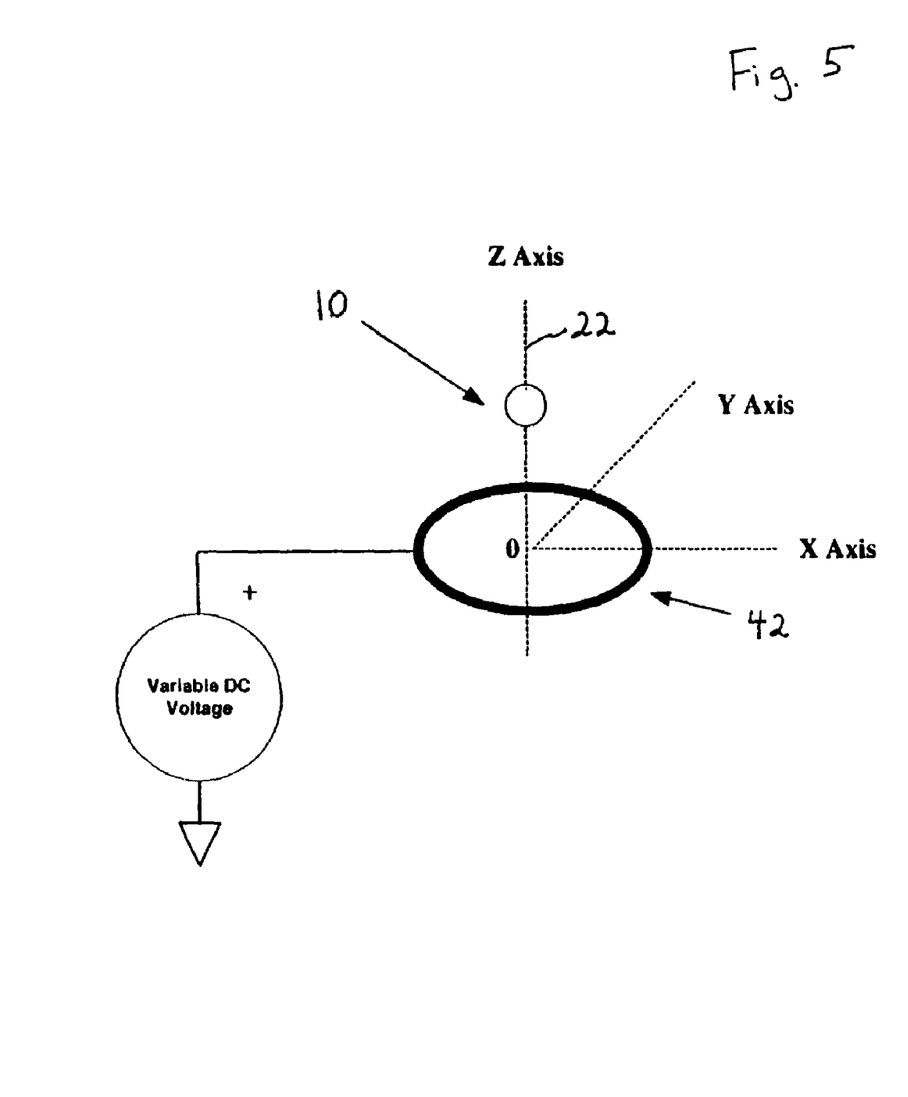
FIG. 5 is a schematic diagram that shows respective forces applied to a colorant particle in accordance with an embodiment of the invention.

FIG. 5 is a schematic diagram that shows respective forces applied to a colorant particle in accordance with an embodiment of the invention. The forces are discussed below in accordance with a display that faces upwardly, i.e., wherein the direction of elongation of the channels is substantially parallel to a gravity vector.

The fluid 50 disposed within the channels 4 can provide a setting time constant to ensure that the position of the colorant particle within the tube is known. The constant is based on the buoyancy effect of each particle, which is arrived at by determining the amount of fluid that the particle displaces. Each colorant particle has a certain mass, and thus gravity pulls the particle toward the bottom end of the channel 4. The constant is therefore also based on the effect of gravity on the colorant particle.

FIG. 5 shows that the force of the electric field acts on the particle in an opposite direction from the force of gravity. The buoyancy force of the particle acts on the particle in the same direction as the force due to the electric field. Thus, if the force of the electric field equals the force of gravity minus the buoyancy force of the particle, then the particle will remain stationary within the channel 4.

The position of the particle within the channel 4 can be precisely estimated by disposing the particle at the bottom of the channel 4 and applying an amount of electric field force that equals the force of gravity minus the buoyancy force of the particle. Thus, the maximum amount of electric field force is applied that does not move the colorant particle upwardly in the channel 4.

The amount of electric field force can then be increased to be greater than the force of gravity minus the buoyancy force of the particle. The particle will then travel upwardly within the channel 4 at a known velocity, i.e., distance per unit of time. A determining device can count the time increments and re-adjust the electric field force to balance the above equation in order to stop the movement of the colorant particle and hold it at a stationary position.

When the display in accordance with the invention is being utilized as a video display, the above equations can be used to allow all of the colorant particles to be positioned for each successive video frame. Thus, the selection of the fluid 50 and the control of the electric field force acting on the changed colorant particle will determine the video frame rate, i.e., the refresh rate.

The above description of force is applied to a display oriented such that the display is facing upwards. However, the display can also be provided for use in any orientation. Modifying the description of forces to correspond to other orientations of the display can be provided via trigonometry.

By selecting a fluid 50 with increased fluid density, the buoyancy force can be made to far exceed the force of gravity, thereby lessening the dependency of particle motion upon the gravity vector. A display that uses a higher fluid density can be used for an indoor/outdoor sign, television display or computer display, such as where the direction of extension of the channels 4 is perpendicular to the gravity vector. Since this display has increased fluid density, a greater electric field force must be used, and thus the video refresh rates may be somewhat slower than for a display that uses a less dense fluid 50. Flicker free video can be achieved if the fluid 50 is of a density so as to provide a time constant for control greater than 60 Hz.

In the exemplary embodiment discussed above, since the location of each colorant particle inside the channels 4 is dependent on an analog voltage bias level, the reflected light from each colorant particle is adjustable in an analog fashion. Therefore, the number of grayscale and color levels is unlimited.

Also, the exemplary embodiments discussed above are inherently dynamic in operation. Thus, the displays discussed above can be used as video displays. However, the displays discussed above can also be used as still image displays.

The exemplary embodiment is discussed above as an analog dot display, wherein each colorant particle is positioned in analog fashion at any location along the direction of extension of the channel 4. However, the invention is intended to cover a variety of other control methods.

For example, the invention can also be applied to a digital dot display, wherein each colorant particle only has two stationary positions. Such a digital dot display can be used to either dispose each particle at the top end of its respective channel 4, which provides maximum color reflection, or at the bottom end of its respective channel 4, which provides minimum color reflection.

Fluid 50 does not need to be provided in the channels 4 of the digital dot display, since it is preferable for each colorant particle to travel between the bottom and top ends of the channels as fast as possible. The digital dot display can operate similarly to an electronic video equivalent of a color ink jet printer, where there is sufficient resolution at each dot and pixel to make the human eye believe the image has continuous grayscale and color reproduction.

The electric field forces discussed above can be calculated in accordance with any conceivable method. For example, in accordance with Gauss' Law, the net electric flux through a surface surrounding the disk electrode is the total charge on the disk divided by the permittivity of the medium, which can be expressed as follows:

$$\phi_{net} = \frac{1}{\varepsilon} q_{inside} = \frac{1}{\varepsilon} Q_d.$$

Integrating across the Gaussian surface enclosing the disk electrode relates the net flux to the electric field, which can be expressed as follows:

$$\phi_{net} = \oint E_n dA = \frac{\sigma A}{\varepsilon}.$$

Therefore, the net electric field can be represented as follows:

$$E_n = \frac{\sigma}{\varepsilon}.$$

Figure 6:
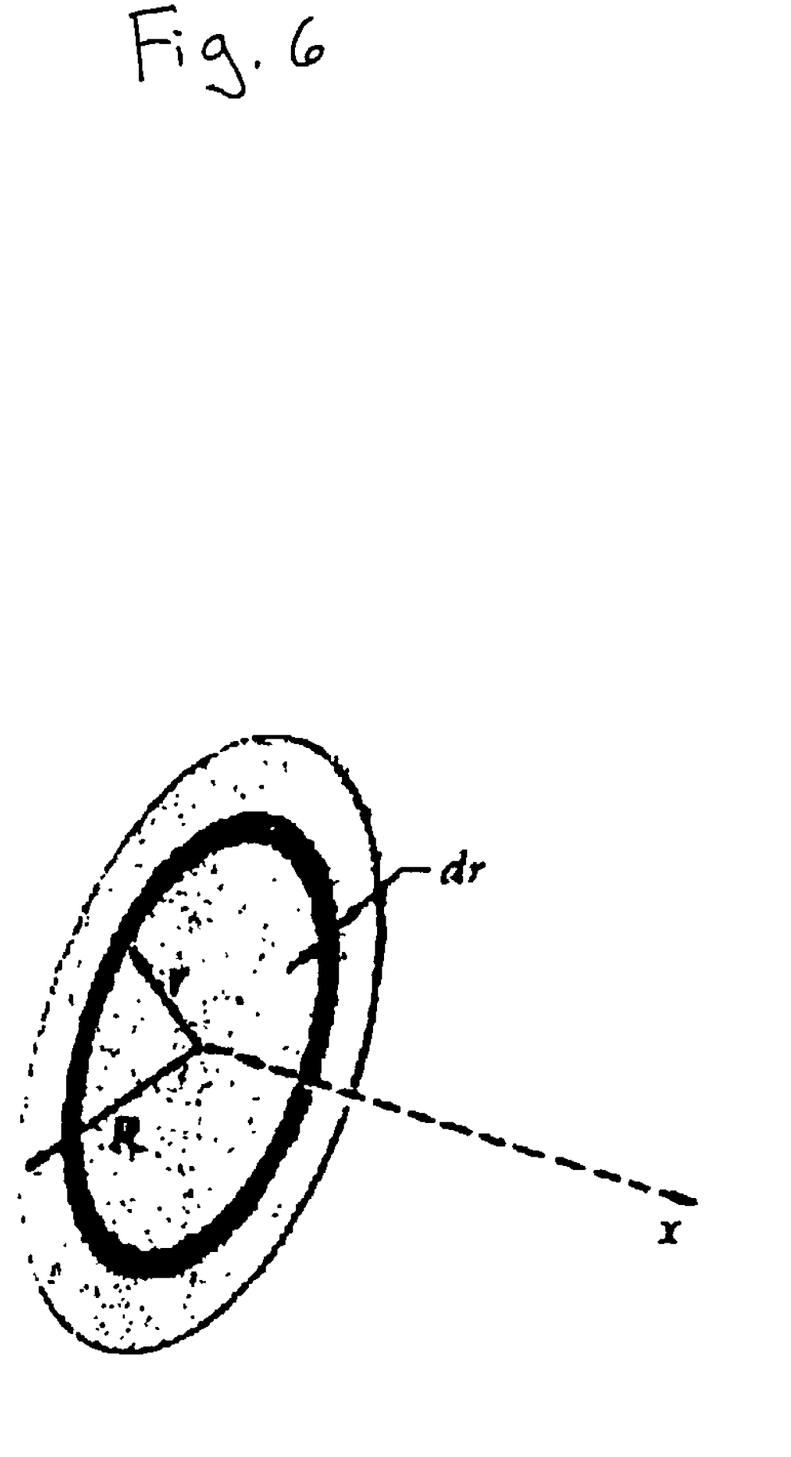
FIG. 6 is a perspective view of a disk which is provided to explain characteristics of an electric field force.

FIG. 6 is a perspective view of a disk which is provided to explain characteristics of an electric field force. FIG. 6, as well as equations relating to this figure, are disclosed in Tipler, P. A., *Physics*, Second Edition, Worth Publishers, Inc., New York, N.Y., 1982. In accordance with related physics, the electric field at a point along the axis of a disk of uniform charge, which can be represented as follows:

$$E_x = 2\pi k\sigma \left(1 - \frac{x}{\sqrt{x^2 + R^2}}\right).$$

The coulumb constant in free space can be represented as follows:

$$k = \frac{1}{4\pi\varepsilon_0}.$$

The force acting on a particle of charge $Q_p$ can be represented as follows:

$$F = Q_p E.$$

The electrode bias can be solved using the force equilibrium equation. Specifically, the force of gravity being equal to the force of electric field can be represented as follows:

$$F_{gravity} = F_{e\text{-}field}.$$

The equation for force due to gravity can be represented as follows:

$$F_{gravity} = m_p g.$$

Thus, the equation for net electric field force in z direction due to charged disk can be represented as follows:

$$F_{e\text{-}field} = Q_p E_z = \frac{2\pi k Q_p Q_d}{A_d}\left(1 - \frac{d}{\sqrt{d^2 + R^2}}\right),$$

wherein:
 $\varepsilon$=permittivity of medium,
 R=radius of disk electrode,
 $A_d$=area of disk,
 d=particle distance from disk plane along z axis,
 $Q_d$=charge on disk electrode,
 $Q_p$=charge of particle,
 g=gravitational constant, and
 $M_p$=mass of particle.

The equation for total electric field strength in z direction at a distance d from the disk plane can be represented as follows:

$$E = \frac{V}{d}.$$

The equation to solve for V, not considering the medium properties, can be represented as follows:

$$V = \frac{2\pi k Q_d d}{A_d}\left(1 - \frac{d}{\sqrt{d^2 + R^2}}\right).$$

Figure 7:
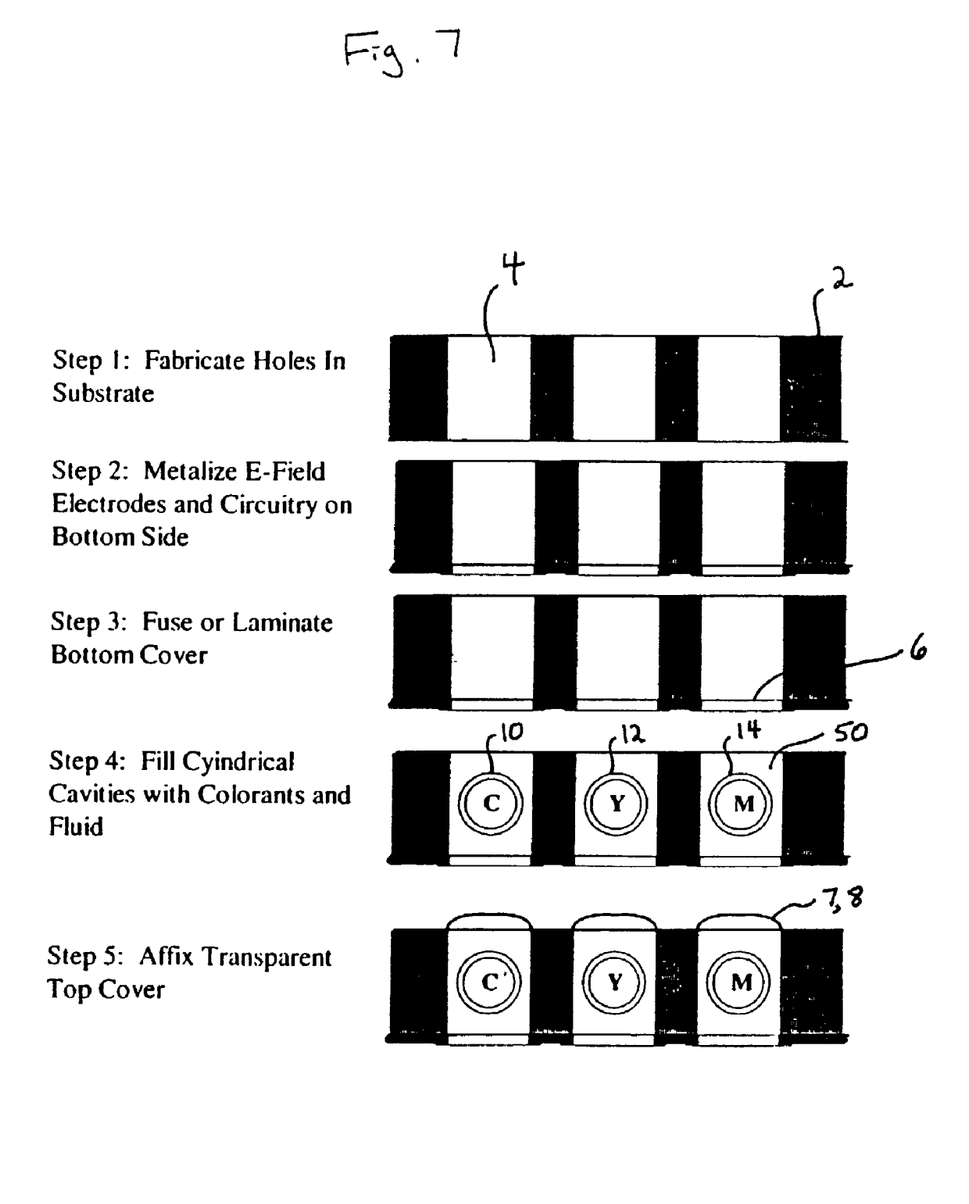
FIG. 7 is a schematic diagram of an exemplary method of manufacturing a display in accordance with the invention.

The invention is also intended to cover any method of manufacturing any of the exemplary embodiments of the displays discussed above. For example, FIG. 7 is a schematic diagram of an exemplary method of manufacturing a display in accordance with the invention.

The method can begin with step 1, wherein a carrier body 2 (base) is provided, and the channels 4 (holes) are defined in the carrier body 2. The channels 4 can be defined in the carrier body 2 by any method, such as, for example, drilling or punching.

In step 2, E-field electrodes and circuitry are metalized on the bottom surface of the carrier body 2 and at the bottom end of the channels 4. The E-field electrodes and circuitry can be provided by any method.

In step 3, the bottom cover 6 is provided at the bottom end of the channels. If a fluid 50 is to be disposed in the channels 4, then the bottom cover 6 should seal the bottom end of the channels 4. Alternatively, if no fluid 50 is to be disposed in the channels 4, then the bottom cover 6 does not need to seal the bottom end of the channels 4. Instead, the bottom cover 6 may only obstruct the colorant particle to prevent the colorant particle from exiting the channel 4. The bottom cover 6 can be fixed at the bottom end of the channels 4 by any method, such as welding, fusing or laminating.

In step 4, a colorant particle is provided in the channels 4. FIG. 7 shows the exemplary embodiment wherein one of a cyan particle 10, a yellow particle 12 and a magenta particle 14 is provided in each of the channels 4. However, as discussed above, in some of the exemplary embodiments, only a single color of particles is provided in each of the channels 4. Also, other exemplary embodiments include colorant particles of different colors. Further, the invention also covers providing colorant particles in only some of the channels 4, and leaving the remaining channels 4 either vacant or provided with something other than colorant particles.

Figure 8:
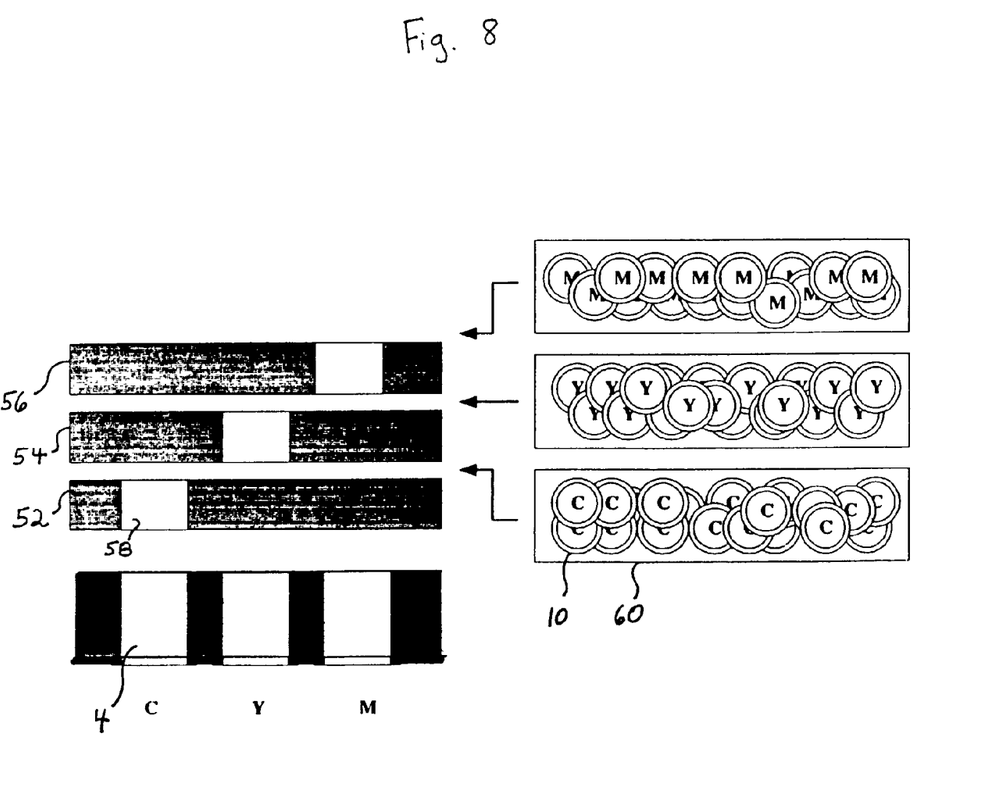
FIG. 8 is a schematic diagram of an exemplary method of providing colorant particles into the channels.

FIG. 8 is a schematic diagram of an exemplary method of providing colorant particles into the channels 4. As shown in FIG. 8, filter plates 52, 54, 56 are used to provide colorant particles into the appropriate channels 4. Specifically, filter plate 52 defines holes 58 that align with the channels 4 to which cyan particles are to be provided.

A dispenser 60 houses multiple cyan particles 10. Multiple cyan particles 10 are supplied from the dispenser 60 to an upper surface of the filter plate 52. The cyan particles 10 are subjected to the force of gravity and thus travel through the holes 58 so as to be only provided to the appropriate channels 4. The yellow and magenta particles 12, 14 are similarly provided to the appropriate channels 4 via filter plates 54, 56.

In step 5 of FIG. 7, the top cover is provided at the top end of the channels 4. FIG. 6 shows an embodiment wherein the top cover 8 and lens 9 define a single element. However, as discussed above, the top cover 8 and lens 9 can define separate elements. Also, as with the bottom cover 6, the top cover 8 and lens 9 are not limited in the manner of affixing them at the top end of the channels 4.

The exemplary embodiments are discussed above in terms of video and/or still picture displays. However, the invention is also intended to cover print media. Specifically, the display can be a print media by locking the colorant particles at appropriate locations within the channels 4, either temporarily or permanently.

The invention is intended to cover any method of locking the colorant particles at appropriate positions within the channels. For example, the fluid 50 provided within the channels 4 can be selected to have properties to provide a phase change to lock the colorant particles in position during a print fixing step. The phase change can be brought about in any manner, such as by a change in temperature.

More specifically, the display can be a print media by providing a separable electrical connection strip on one side of the carrier body 2. The electrode array can be electrically biased for each pixel corresponding to a digital image. While the electric field holds the colorant particles in place within the channels 4, heat, pressure and/or light fixing can be used to lock the colorant particles in place.

The exemplary embodiments of the methods and apparatus of the invention provide various advantages. For example, the invention can be applied to a wide variety of displays, such as, but not limited to, very small (less than 1 inch per side) display with XGA or greater resolution that could be used inside video or still frame digital cameras, eyeglass or wristwatch displays, cell phone displays, or business and entertainment video projectors (which currently use <1" liquid crystal or MEMS displays), indoor/outdoor still frame and video signage where the system would be produced using a low cost plastic as the substrate, high definition television applications such as ultra-flat wall displays, computer display applications, cell phone displays, and high density light communications switching matrix.

The display/print media can provide full color capability. Since the amount of reflected light is dependent upon depth of the colorant particle inside the channel, the amount of reflected "color" for each of the primary colors is theoretically infinitely variable. Thus, a full color display/print media can be provided employing RGB, CYMK and/or other primary color systems.

The display provides fast video refresh rate in a digital dot display. The speed of refresh rate is adjustable by virtue of fluid properties of a fluid provided in the channels in an analog dot display.

The invention can be applied to provide very, very small displays. For example, pigment type color particles can be used that are on the order of a few micrometers in size. However, the invention can be applied to provide even smaller displays, such as a "nano-display," where each color particle could be either a single atom or a molecular compound that includes several atoms on the order of a few nanometers in size. For micro-displays, the invention could achieve something on the order or 2,000 lines per inch of display resolution. For nano-displays, the invention could achieve 100s of thousands of lines per inch of display resolution.

Limitation on miniaturization of the technology is simply associated with the wavelength of light in the visible spectrum since the tube openings will act as diffraction gratings. For example, the visible spectrum is between 400–700 nanometers of wavelength. Therefore, if the diameter of the tube is only 600 nm, most of the visible spectrum of incident light will be filtered and no visible light (color) would be reflected. Therefore, the size of the tube openings may exceed 700 nanometers to be of use for visual displays. However, the invention could be applied to provide non-visible wavelengths, such as for an optical communication device.

The invention can also be applied to provide low cost manufacturing for large area devices, such as wall displays. Such displays could use polymer or plastic as the substrate material.

Figure 9:
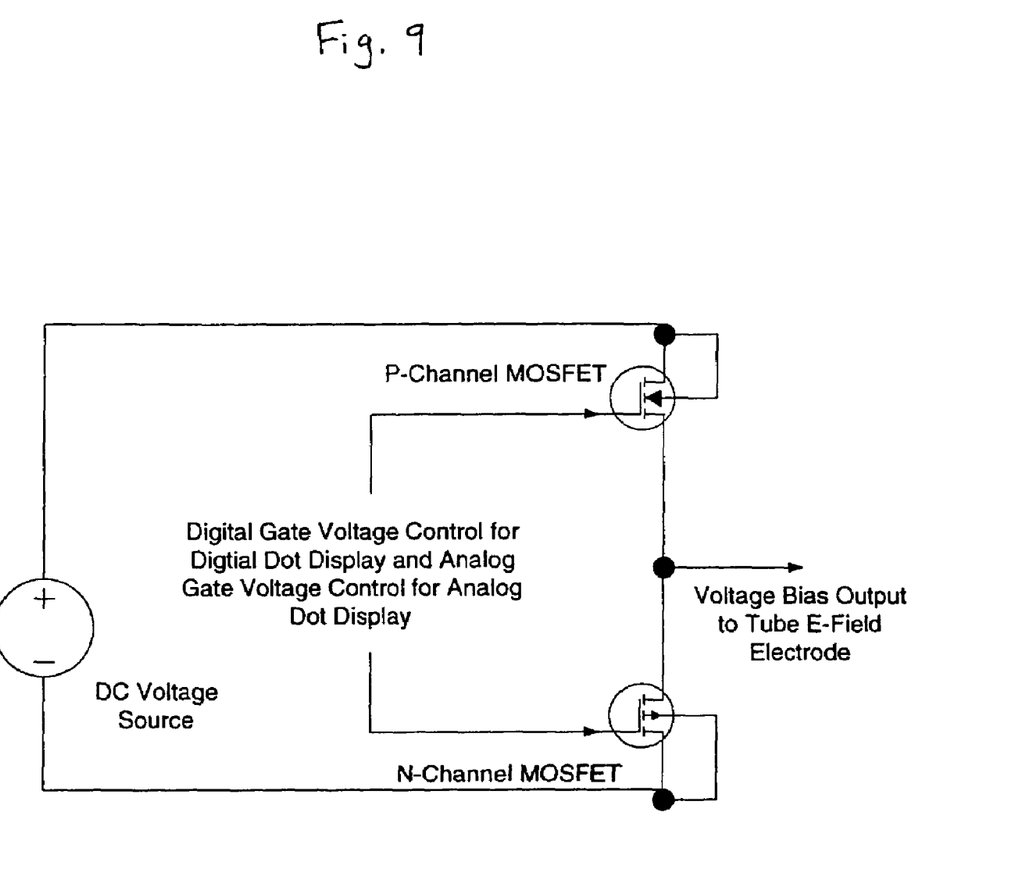
FIG. 9 is a schematic diagram of an electrode drive circuit architecture using a classic CMOS output for use as a control circuit for the display in accordance with the invention.

Simple dot and pixel control electronics can be used to control the display/print media in accordance with the invention. For example, FIG. 9 is a schematic diagram of an electrode drive circuit architecture using a classic CMOS output for use as a control circuit for the display/print media in accordance with the invention.

Further, inherently low power drive electronics can be used in accordance with the invention due to the use of an electric rather than magnetic field as the prime mover of the colorant particles, and the fact that the colorant particles are of very low mass. The electric field can be generated by simple voltage bias of a ring, plate or disk electrode, wherein E-field strength is proportional to the voltage on the electrode, etc.

While the systems and methods of this invention have been described in conjunction with the specific embodiments outlined above, it is evident that many alternatives, modifications and variations will be apparent to those skilled in the art. Accordingly, the exemplary embodiments of the systems and methods of this invention, as set forth above, are intended to be illustrative, not limiting. Various changes may be made without departing from the spirit and scope of the invention.

What is claimed is:

1. A method of manufacturing a display, comprising the steps of:
    defining at least one elongated channel in a carrier body;
    disposing an electrode and circuitry at at least one of top and bottom surfaces of the carrier body;
    affixing a bottom cover at a bottom end of the at least one elongated channel;
    providing at least one colorant particle in the at least one elongated channel so as to be movable in a direction of elongation of the at least one elongated channel by energizing the electrode; and
    affixing a top cover at a top end of the at least one elongated channel.

2. The method according to claim 1, wherein the defining step includes defining first, second and third channels in the carrier body, and the providing step includes providing a cyan particle in the first channel, providing a yellow particle in the second channel and providing a magenta particle in the third channel.

3. The method according to claim 2, wherein the providing steps include using a filter plate for each of the cyan, yellow and magenta particles to ensure entry of each of the cyan, yellow and magenta particles only into selected channels.

4. The method according to claim 1, wherein the defining step includes defining first, second and third channels in the carrier body, and the providing step includes providing a red particle in the first channel, providing a green particle in the second channel and providing a blue particle in the third channel.

5. The method according to claim 1, wherein the defining step includes defining first, second, third and fourth channels in the carrier body, and the providing step includes providing a cyan particle in the first channel, providing a yellow particle in the second channel, providing a magenta particle in the third channel and providing a black particle in the fourth channel.

6. The method according to claim 1, wherein only one of the top and bottom surfaces include a transparent member.

7. The method according to claim 6, wherein the transparent member is a lens that improves optical characteristics.

8. A method of printing an image on a print media, comprising the steps of:
    defining at least one elongated channel in the print media;
    affixing a bottom cover at a bottom end of the at least one elongated channel;
    providing at least one particle in the at least one elongated channel;
    affixing a top cover at a top end of the at least one elongated channel;
    moving the at least one particle along a direction of elongation of the at least one elongated channel; and
    locking the at least one particle at a specified position along the direction of elongation of the at least one elongated channel.

9. The method according to claim 8, wherein the moving step includes applying an electric field to the at least one particle with an electrode that is removably disposed at at least one of bottom and top surfaces of the print media.

10. The method according to claim 8, wherein the locking step includes at least one of pressure and temperature fixing.

11. The method according to claim 8, wherein the locking step includes light fixing.

12. The method according to claim 8, wherein the moving step includes applying an electric field to the at least one particle with an electrode that is permanently affixed to a bottom surface of the print media.

13. The method according to claim 8, wherein only one of the top and bottom surfaces include a transparent member.

14. The method according to claim 13, wherein the transparent member is a lens that improves optical characteristics.

* * * * *